United States Patent
Imamura et al.

(10) Patent No.: US 7,466,346 B2
(45) Date of Patent: Dec. 16, 2008

(54) IMAGE PROCESSING DEVICE AND CAMERA

(75) Inventors: Kunihiro Imamura, Kyoto (JP); Takahiro Iwasawa, Kyoto (JP); Yoshimitsu Sasaki, Kyoto (JP)

(73) Assignee: Panasonic Corporation, Osaka (JP)

( * ) Notice: Subject to any disclaimer, the term of this patent is extended or adjusted under 35 U.S.C. 154(b) by 683 days.

(21) Appl. No.: 10/793,795

(22) Filed: Mar. 8, 2004

(65) Prior Publication Data

US 2004/0183922 A1 Sep. 23, 2004

(30) Foreign Application Priority Data

Mar. 20, 2003 (JP) .............................. 2003-077424

(51) Int. Cl.
*H04N 9/73* (2006.01)
(52) U.S. Cl. ................................. 348/222.1; 348/223.1
(58) Field of Classification Search ................. 348/222, 348/222.1, 223.1
See application file for complete search history.

(56) References Cited

U.S. PATENT DOCUMENTS

| 5,260,774 | A | 11/1993 | Takayama |
| 5,808,681 | A | 9/1998 | Kitajima |
| 2002/0044151 | A1* | 4/2002 | Ijima et al. ................... 345/601 |
| 2003/0011693 | A1* | 1/2003 | Oda ........................... 348/272 |
| 2003/0048366 | A1 | 3/2003 | Kondo |
| 2005/0253934 | A1* | 11/2005 | Yamagishi et al. ........ 348/222.1 |

FOREIGN PATENT DOCUMENTS

| JP | 3-74980 | 3/1991 |
| JP | 03074980 A * | 3/1991 |

* cited by examiner

*Primary Examiner*—Tuan V Ho
(74) *Attorney, Agent, or Firm*—McDermott Will & Emery LLP

(57) ABSTRACT

An image processing device for performing image processing for an image signal output from an image sensor, including: a preprocessing circuit for generating a correction signal based on the image signal from the image sensor; a signal processing circuit for correcting the image signal using the correction signal and converting the corrected signal to a luminance signal and a color-difference signal; and a control block. The control block performs either first processing in which the signal processing circuit uses the correction signal generated based on an image of a frame preceding the frame of an image currently supplied to the signal processing circuit, or second processing in which the image signal obtained from the image sensor is stored in an external memory, the stored image is read and supplied to the signal processing circuit, and the signal processing circuit uses the correction signal generated based on the image of the same frame as the supplied image.

13 Claims, 4 Drawing Sheets

IMAGE PROCESSING DEVICE AND CAMERA

BACKGROUND OF THE INVENTION

The present invention relates to an image processing device for processing a signal output from an image sensor and outputting the processed signal.

In digital cameras that use a charge-coupled device (CCD), a complementary metal oxide semiconductor (CMOS) image pickup device or the like as an image sensor, such as digital still cameras, digital camera-equipped mobile phones and digital video cameras, an image processing device performs image processing for an image signal read from the image sensor and outputs the results to a display device and a recording device. The image processing includes correction of the black level, correction of the white balance and the like.

FIG. 3 is a block diagram showing a configuration of a conventional camera. Referring to FIG. 3, an image signal read from an image sensor 912 line by line is converted to a digital signal by an AD converter (ADC) 913, and then supplied to a preprocessing circuit 926 and a signal processing circuit 928. The preprocessing circuit 926 generates a correction signal based on the input image signal and outputs the generated correction signal to the signal processing circuit 928. The preprocessing circuit 926 is allowed to output a correction signal generated based on an image of one frame only after receiving the entire image signal of the frame. The signal processing circuit 928 therefore corrects an image to be processed using a correction signal generated based on an image preceding the current image by one frame.

In the camera of FIG. 3 having the above configuration, proper correction will not be obtained when an object to be imaged moves largely, and this may degrade the quality of the processed image. There is also known a camera as follows, in which an improvement has been made in the above point.

FIG. 4 is a block diagram showing another configuration of a conventional camera (a roughly identical configuration to this is disclosed in FIG. 4 of Japanese Laid-Open Patent Publication No. 3-74980, for example). Referring to FIG. 4, an image signal read from an image sensor 912 line by line is converted to a digital signal by an AD converter 913, and then supplied to a preprocessing circuit 926 and also to a buffer memory 924. The preprocessing circuit 926 generates a correction signal based on the input image signal and outputs the generated correction signal to the signal processing circuit 928, as in the camera of FIG. 3. The signal processing circuit 928 starts reading the image signal stored in the buffer memory 924 after a lapse of the time of one frame from the start of storage of the image signal in the buffer memory 924.

In the camera of FIG. 4, the signal processing circuit 928 corrects an image to be processed using a correction signal generated based on this image. Hence a high-quality image can be obtained.

However, the use of a buffer memory for temporarily storing an image increases power consumption. In addition, a buffer memory, which is often provided as an external memory outside the image processing device, consumes large power. These pose a large problem for portable cameras that often use a battery as the power supply. In view of this, processing with a buffer memory should desirably be performed only when necessary.

No external memory is provided in some cases for cost reduction of the entire system. In recent years, reduction in the development cost of image processing devices has been strongly demanded. Under these circumstances, it is desired that one type of image processing device should be adaptable to both a system having an external memory and a system having no external memory.

SUMMARY OF THE INVENTION

An object of the present invention is providing an image processing device capable of selectively performing image processing placing high priority on the image quality and image processing placing high priority on reduction of power consumption, as required. Another object of the present invention is providing a highly versatile image processing device usable for various systems.

Specifically, the present invention is directed to an image processing device for performing image processing for an image signal output from an image sensor and outputting the processed signal, including: a preprocessing circuit for generating a correction signal for correcting an image signal obtained from the image sensor based on the image signal and outputting the correction signal; a signal processing circuit for correcting an image signal obtained from the image sensor using the correction signal, converting the corrected signal to a luminance signal and a color-difference signal, and outputting the results; and a control block for performing either first processing in which the signal processing circuit uses the correction signal generated based on an image of a frame preceding a frame of an image currently supplied to the signal processing circuit, or second processing in which an image signal obtained from the image sensor is stored in an external memory provided outside the image processing device, the stored image is read and supplied to the signal processing circuit, and the signal processing circuit uses the correction signal generated based on the image of the same frame as the supplied image.

According to the invention described above, it is possible to selectively perform the processing using no external memory and the processing of correcting an image to be processed using a correction signal generated based on the same image. This makes it possible to perform appropriate processing according to the situation. Also, an image processing device operable irrespective of existence of an external memory can be provided.

Preferably, the image processing device described above further includes a determination section for determining which processing the control block should perform, the first processing or the second processing, and instructing the control block to perform the processing.

According to the invention described above, the determination section instructs the control block to perform the first processing when it determines that the power consumption must be reduced, and perform the second processing when it determines that the image quality must be enhanced. This makes it possible to perform appropriate processing according to the situation.

Preferably the image processing device described above further includes an internal memory, wherein the signal processing circuit performs its processing using the internal memory when the first processing is performed and the determination section outputs a signal for giving control so that the power consumed by the external memory is reduced when the first processing is performed.

According to the invention described above, it is possible to reduce the power consumed by the external memory of which operation is unnecessary.

In the image processing device described above, preferably, the correction signal is at least either a black level correction signal or a white balance correction signal.

In the image processing device described above, preferably, the external memory is configured to be removably mounted to the image processing device.

According to the invention described above, whether the external memory is used to attain high image quality processing or is not used to secure cost reduction can be easily selected.

In the image processing device described above, preferably, the signal processing circuit further performs compression coding of an image based on the luminance signal and the color-difference signal, and outputs the resultant codes.

According to the invention described above, image compressed codes suitable for recording and transfer can be obtained.

The camera of the present invention includes: the image processing device described above; an image sensor for outputting an image signal to the image processing device; and a recording device for writing codes output from the image processing device on a recording medium.

DESCRIPTION OF THE PREFERRED EMBODIMENTS

Hereinafter, a preferred embodiment of the present invention will be described with reference to the accompanying drawings.

Figure 1:
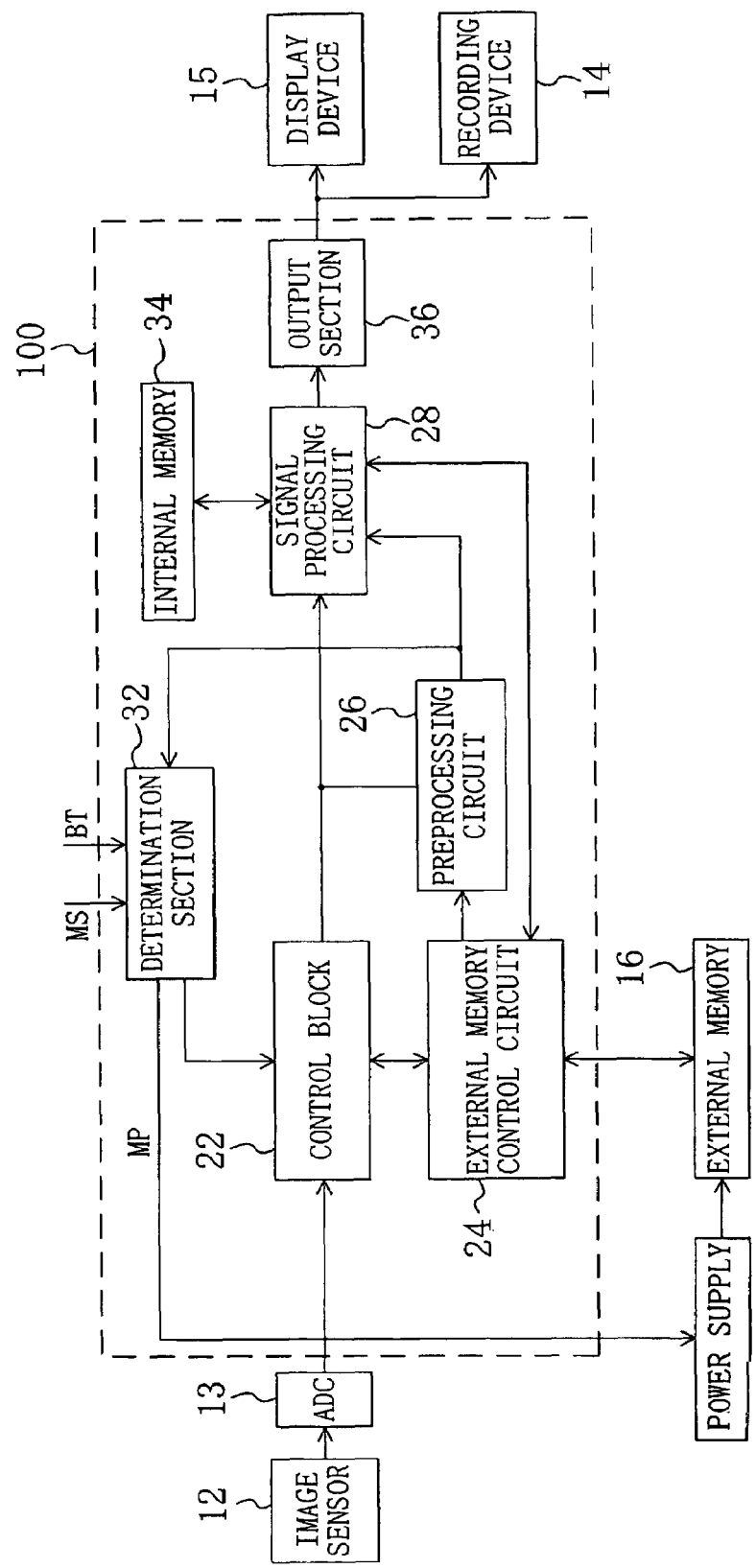
FIG. 1 is a block diagram showing a configuration of a camera having an image processing device of an embodiment of the present invention.

FIG. 1 is a block diagram showing a configuration of a camera having an image processing device of an embodiment of the present invention. The camera of FIG. 1 is a digital still camera, a digital camera-equipped mobile phone or a digital video camera, for example. The camera of FIG. 1 includes an image processing device 100, an image sensor 12, an AD converter (ADC) 13, a recording device 14, a display device 15, an external memory 16 and a power supply circuit 17. The image processing device 100 includes a control block 22, an external memory control circuit 24, a preprocessing circuit 26, a signal processing circuit 28, a determination section 32, an internal memory 34 and an output section 36. The determination section 32 is a CPU, for example.

The image sensor 12, which is a CCD or a CMOS image pickup device, for example, outputs an image signal to the AD converter 13. The AD converter 13 converts the input signal to a digital signal and outputs the result to the control block 22.

The external memory 16, used as a frame memory, has a capacity large enough to store at least one frame of the largest image among images to be processed by the image processing device 100. The external memory 16 is removably mounted to the image processing device 100. The power supply circuit 17 supplies power to the external memory 16 under instructions from the determination section 32.

The control block 22 outputs the received image signal to the external memory control circuit 24, the preprocessing circuit 26 and the signal processing circuit 28 under instructions from the determination section 32, and also controls the operation of the external memory control circuit 24. The external memory control circuit 24 controls transfer of image signals between the external memory 16 and each of the control block 22, the preprocessing circuit 26 and the signal processing circuit 28.

The preprocessing circuit 26 generates at least one of a black level correction signal (OB signal) and a white balance correction signal (AWB signal) as a correction signal based on an image signal received from the control block 22 or the external memory control circuit 24, and outputs the generated signal to the signal processing circuit 28.

The signal processing circuit 28 corrects an image signal received from the control block 22 or the external memory control circuit 24 using the correction signal received from the preprocessing circuit 26, and then converts the corrected signal to a luminance signal and a color-difference signal (hereinafter, these signals are collectively called YC signals), and outputs the resultant signals to the output section 36. The correction by the signal processing circuit 28 specifically includes processing of subtracting the black level correction signal from the image signal and processing of correcting the color according to the white balance correction signal.

The signal processing section 28 further performs JPEG (joint photographic image coding experts group) compression coding for an image to be recorded and outputs the resultant JPEG codes to the output section 36. The signal processing circuit 28 uses the internal memory 34 or the external memory 16 to perform the above processing.

The determination section 32 selects the processing to be performed by the control block 22 according to the situation, and instructs the control block 22 to perform the selected processing. The internal memory 34 is a line memory for storing an image line by line.

The output section 36, having a buffer, serves as an interface converting the output of the signal processing circuit 28 to signals in forms suitable for writing on a recording medium in the recording device 14 and display on the display device 15. Specifically, the output section 36 converts the JPEG codes and the YC signals accordingly and outputs the results to the recording device 14 and the display device 15, respectively. The recording device 14 writes the received JPEG codes on the recording medium such as a memory card. The display device 15 displays the received YC signals.

Figure 2:
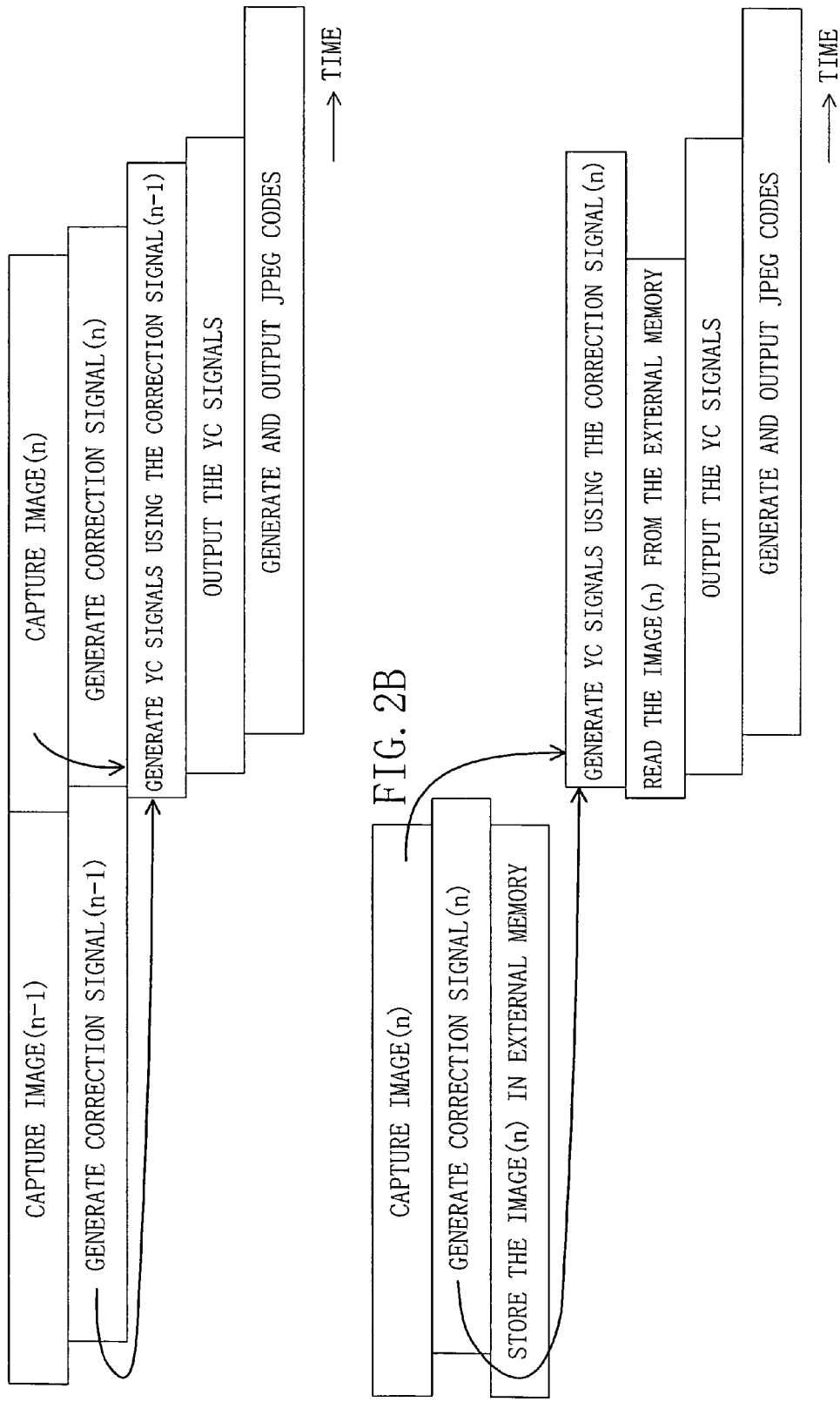
FIG. 2A is a timing chart showing an operation of the image processing device in FIG. 1 performed without use of an external memory.
FIG. 2B is a timing chart showing an operation of the image processing device in FIG. 1 performed with use of an external memory.
Figure 3:
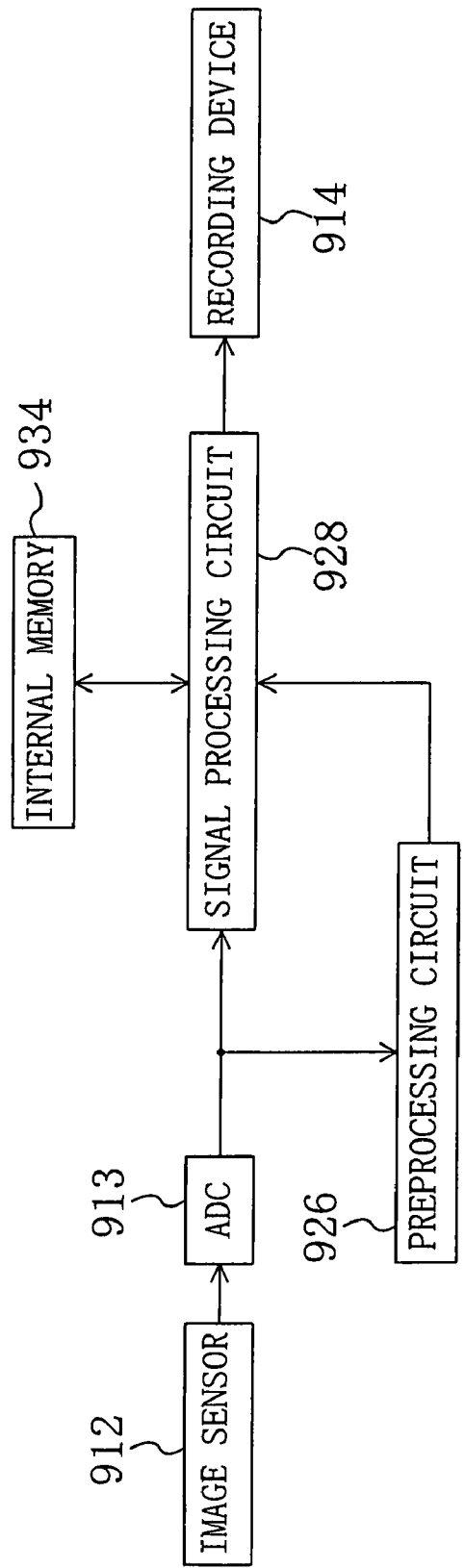
FIG. 3 is a block diagram showing a configuration of a conventional camera.
Figure 4:
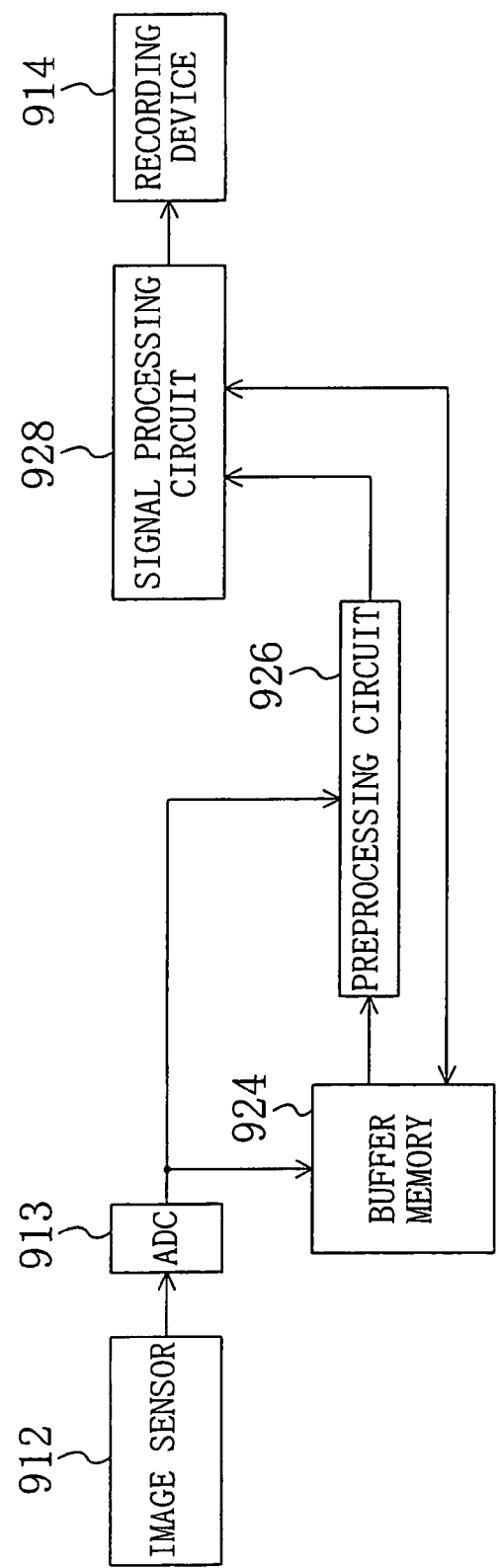
FIG. 4 is a block diagram showing another configuration of a conventional camera.

FIG. 2A is a timing chart showing an operation of the image processing device in FIG. 1 performed without use of the external memory 16. FIG. 2B is a timing chart showing an operation of the image processing device in FIG. 1 performed with use of the external memory 16. In the following description, assume that an image of the n-th frame (n is an integer) is to be recorded.

In the case of FIG. 2A, the control block 22 performs processing (first processing) of supplying a correction signal (expressed as correction signal (n−1) in FIG. 2A) generated based on an image of the (n−1)th frame, which precedes the image of the n-th frame (expressed as image (n) in FIG. 2A) currently given to the signal processing circuit 28, to the signal processing circuit 28.

Specifically, when an image signal representing the image of the (n−1)th frame is input into the control block 22, the control block 22 outputs this signal to the preprocessing circuit 26 and the signal processing circuit 28 under instructions from the determination section 32. The preprocessing circuit 26 then starts generation of a correction signal (OB signal or AWB signal) based on the received image of the (n−1)th frame. Once receiving the entire image of this frame, the preprocessing circuit 26 outputs the generated correction signal to the signal processing circuit 28.

After the input of the image signal of the (n−1)th frame is finished, an image signal of the n-th frame is input into the control block 22. The control block 22 outputs this signal to the preprocessing circuit 26 and the signal processing circuit 28 under instructions from the determination section 32. The signal processing circuit 28 starts the correction and generation of YC signals for the image of the n-th frame using the correction signal generated based on the image of the (n−1)th frame, and outputs the resultant YC signals sequentially to the output section 36. The signal processing circuit 28 also performs JPEG compression coding for the image of the n-th frame based on the YC signals, as required, and outputs the results sequentially to the output section 36.

As described above, in the case of FIG. 2A in which the external memory 16 is not used, it is possible to perform image processing placing high priority on reduction of power consumption. In addition, since the image signal representing the image of the n-th frame output from the image sensor is immediately processed by the signal processing circuit 28, the image of this frame can be displayed on the display device without delay. This gives an advantage that the object to be imaged can be tracked easily.

However, in the above processing, in which the image of the n-th frame given to the signal processing circuit 28 is corrected using the correction signal generated based on the image of the (n−1)th frame, if a large difference exists between the image of the n-th frame and the image of the (n−1)th frame, the correction signal is no more an appropriate signal, and thus the quality of the resultant image may degrade.

In the case of FIG. 2B, the control block 22 performs processing (second processing) of supplying a correction signal generated based on the image of the n-th frame that is the same as the image currently given to the signal processing circuit 28, to the signal processing circuit 28.

Specifically, when an image signal representing the image of the n-th frame is input into the control block 22, the control block 22 outputs the signal to the preprocessing circuit 26 and also to the external memory 16 to be stored therein under instructions from the determination section 32. The preprocessing circuit 26 then starts generation of a correction signal based on the received image of the n-th frame. Once receiving the entire image of this frame, the preprocessing circuit 26 outputs the generated correction signal to the signal processing circuit 28.

The control block 22 then reads the image of the n-th frame from the external memory 16 and supplies the image to the signal processing circuit 28. The signal processing circuit 28 starts correction and generation of YC signals for the image of the n-th frame using the correction signal generated based on the image of the n-th frame, and outputs the resultant YC signals sequentially to the output section 36. The signal processing circuit 28 also performs compression coding for the image of the n-th frame as required, and outputs the results to the output section 36.

As described above, in the case of FIG. 2B, the image of the n-th frame is corrected using the correction signal generated based on the image of this frame. This enables supply of appropriate correction signals at all times, and thus a high-quality image can be obtained. In this way, it is possible to perform image processing placing high priority on the image quality.

However, in the above processing, in which the image signal representing the image of the n-th frame output from the image sensor is stored in the external memory 16, and processed by the signal processing circuit 28 after a lapse of the time of one frame, a delay arises in display of the image on the display device.

Note that the control block 22 is configured to perform the first processing when the external memory 16 is not connected to the image processing device 100.

The operation of the determination section 32 will be described. The determination section 32 selects either the image processing (first processing) placing high priority on reduction of power consumption or the image processing (second processing) placing high priority on the image quality, as required, and instructs the control block 22 to perform the selected processing.

For example, consider the camera of FIG. 1 is driven with a battery and the determination section 32 receives a signal BT indicating the remaining amount of the battery from a circuit detecting the remaining amount of the battery. When the remaining amount of the battery is equal to or smaller than a predetermined value, the determination section 32 determines that the power consumption must be reduced and instructs the control block 22 to perform the first processing.

Alternatively, the processing may be selected according to an operation mode set. For example, the determination section 32 may receive a signal MS indicating the operation mode. The determination section 32 may instruct the control block 22 to perform the first processing when the signal MS indicates a low image quality mode and the second processing when the signal MS indicates a high image quality mode.

Otherwise, the processing may be selected based on the history of the correction signal such as the OB signal and the AWB signal. For example, when the change in value of the OB or AWB signal in a predetermined length of time period until the current time falls within a predetermined value, it is presumed that no large difference exists between the correction signal generated based on the image of the current frame and the correction signal generated based on the image of the frame preceding the current frame. In such a case, therefore, the determination section 32 instructs the control block 22 to perform the first processing, to enable reduction of power consumption.

On the contrary, when the change in value of the OB or AWB signal in the predetermined length of time period until the current time exceeds the predetermined value, or when no value of such a signal is available in the predetermined length of time period (for example, when an image is taken immediately after the startup), the determination section 32 instructs the control block 22 to perform the second processing.

The control section 32 may otherwise determine which processing should be performed, the first or second processing, according to an evaluation function generated based on the correction signal such as the OB signal and the AWB signal.

When the first processing is performed, the determination section 32 may supply a control signal MP to the power supply circuit 17 so that the power consumed by the external memory 16 is reduced. Receiving the control signal MP, the power supply circuit 17 stops supply of power to the external memory 16. During this stop of power supply, the signal processing circuit 28 is allowed to perform the processing using the internal memory 34, not the external memory 16. This can reduce the power consumption. The use of only the internal memory 34 can also enhances the speed of the processing by the signal processing circuit 28.

There may also be provided a circuit that can reduce the frequency of the clock supplied to the external memory 16 once the determination section 32 outputs the control signal MP. In this case, also, the power consumed by the external memory 16 can be reduced.

The external memory 16 may have a function of reducing its own power consumption, and the determination section 32 may supply a signal to the external memory 16 directly or via the external memory control circuit 24 to instruct the external memory 16 to reduce the power consumption.

As described above, according to the present invention, it is possible to provide an image processing device capable of selectively performing image processing placing high priority on the image quality and image processing placing high priority on reduction of power consumption, as required. It is also possible to provide a highly versatile image processing device operable irrespective of whether or not an external memory is connected and thus usable for various systems.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. An image processing device for performing image processing for an image signal output from an image sensor and outputting the processed signal, comprising:
   a preprocessing circuit for generating a correction signal for correcting an image signal obtained from the image sensor based on the image signal and outputting the correction signal;
   a signal processing circuit for correcting an image signal obtained from the image sensor using the correction signal, converting the corrected signal to a luminance signal and a color-difference signal, and outputting the results; and
   a control block being selectively operable in a first processing mode or a second processing mode, the control block performing first processing in which the signal processing circuit uses the correction signal generated based on an image of a frame preceding a frame of an image currently supplied to the signal processing circuit in the first processing mode, and second processing in which an image signal obtained from the image sensor is stored in a memory provided outside the image processing device, the stored image is read and supplied to the signal processing circuit, and the signal processing circuit uses the correction signal generated based on the image of the same frame as the supplied image in the second processing mode.

2. The device of claim 1, further comprising a determination section for determining which processing the control block should perform, the first processing or the second processing, and instructing the control block to perform the processing.

3. The device of claim 2, further comprising an internal memory, wherein the signal processing circuit performs its processing using the internal memory when the first processing is performed and the determination section outputs a signal for giving control so that the power consumed by the memory provided outside the image processing device is reduced when the first processing is performed.

4. The device of claim 1, wherein the correction signal is at least either a black level correction signal or a white balance correction signal.

5. The device of claim 1, wherein the memory provided outside the image processing device is configured to be removably mounted to the image processing device.

6. The device of claim 1, wherein the signal processing circuit further performs compression coding of an image based on the luminance signal and the color-difference signal, and outputs the resultant codes.

7. A camera comprising:
   the image processing device of claim 6;
   an image sensor for outputting an image signal to the image processing device; and
   a recording device for writing codes output from the image processing device on a recording medium.

8. An image processing method of performing image processing using an image processing device for an image signal output from an image sensor, comprising:
   a preprocessing step of generating a correction signal for correcting an image signal obtained from the image sensor based on the image signal;
   a signal processing step of correcting an image signal obtained from the image sensor using the correction signal, converting the corrected signal to a luminance signal and a color-difference signal; and
   a control step of selectively performing either first processing in which the signal processing step uses the correction signal generated based on an image of a frame preceding a frame of an image currently supplied to the signal processing step, or second processing in which an image signal obtained from the image sensor is stored in a memory provided outside the image processing device, the stored image is read and supplied to the signal processing step, and the signal processing step uses the correction signal generated based on the image of the same frame as the supplied image.

9. The method of claim 8, further comprising a determination step of determining which processing the control step should perform, the first processing or the second processing.

10. The method of claim 9, wherein the signal processing circuit performs its processing using an internal memory provided in the image processor when the first processing is performed and
   the determination step generates a signal for giving control so that the power consumed by the memory provided outside the image processing device is reduced when the first processing is performed.

11. The method of claim 8, wherein the correction signal is at least either a black level correction signal or a white balance correction signal.

12. The method of claim 8, wherein the memory provided outside the image processing device is configured to be removably mounted to the image processing device.

13. The method of claim 8, wherein the signal processing step further performs compression coding of an image based on the luminance signal and the color-difference signal.

* * * * *